(12) United States Patent
Stefanov-Wagner et al.

(10) Patent No.: US 12,090,916 B2
(45) Date of Patent: Sep. 17, 2024

(54) EXTERIOR LIGHTING

(71) Applicant: Apple Inc., Cupertino, CA (US)

(72) Inventors: Thaddeus Stefanov-Wagner, Mountain View, CA (US); Albert J. Golko, Saratoga, CA (US); Sawyer I. Cohen, Menlo Park, CA (US); Ibuki Kamei, Santa Clara, CA (US); Ryan J. Garrone, San Francisco, CA (US); Matthew E. Last, San Jose, CA (US); Clarisse Mazuir, San Jose, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 17/552,292

(22) Filed: Dec. 15, 2021

(65) Prior Publication Data

US 2022/0105864 A1  Apr. 7, 2022

Related U.S. Application Data

(60) Continuation of application No. 16/526,905, filed on Jul. 30, 2019, now Pat. No. 11,230,225, which is a
(Continued)

(51) Int. Cl.
*B60Q 1/26* (2006.01)
*B60Q 1/04* (2006.01)
(Continued)

(52) U.S. Cl.
CPC .............. *B60Q 1/26* (2013.01); *B60Q 1/0408* (2013.01); *B60Q 1/2619* (2013.01); *B60Q 1/268* (2013.01);
(Continued)

(58) Field of Classification Search
CPC ........ B60Q 1/2619; B60Q 1/34; B60Q 1/343; B60Q 1/346; B60Q 1/38; B60Q 1/44;
(Continued)

(56) References Cited

U.S. PATENT DOCUMENTS 3,486,066 A   12/1969  Jones et al.
3,576,364 A * 4/1971  Zanoni .................. G02F 1/1313
                                              349/35
(Continued)

FOREIGN PATENT DOCUMENTS

DE         20316660 U1 *  2/2004  ............. B60R 13/00
DE     102013223717 A1 *  5/2015  ........... B60Q 1/0041
(Continued)

*Primary Examiner* — Erin Kryukova
(74) *Attorney, Agent, or Firm* — Treyz Law Group, P.C.; G. Victor Treyz; Kendall P. Woodruff

(57) ABSTRACT

Light-based devices may be provided that emit light. The light-based devices may be incorporated into systems such as vehicles. The light-based devices may include light sources such as light-emitting diodes and lasers. Mirrors may be used to collimate light from the light sources. Light modulators may be used to pattern light from the light sources. The light sources may include light sources of different colors. Arrays of pixels may be used to provide dynamically varying patterns of emitted light. A light source may produce light that is diffracted by an array of diffractive elements on a window. Mechanical and electrical shutters may obscure light sources, mirrors, and light-emitting components mounted on windows.

18 Claims, 17 Drawing Sheets

Related U.S. Application Data division of application No. 15/092,540, filed on Apr. 6, 2016, now abandoned.

(60) Provisional application No. 62/143,703, filed on Apr. 6, 2015.

(51) Int. Cl.

| | | |
|---|---|---|
| *B60Q 1/34* | (2006.01) | |
| *B60Q 1/38* | (2006.01) | |
| *B60Q 1/44* | (2006.01) | |
| *B60Q 1/50* | (2006.01) | |
| *F21S 41/60* | (2018.01) | |
| *F21S 41/63* | (2018.01) | |
| *F21S 41/64* | (2018.01) | |
| *F21S 41/675* | (2018.01) | |
| *F21S 41/683* | (2018.01) | |
| *F21S 41/689* | (2018.01) | |
| *F21S 43/00* | (2018.01) | |
| *F21S 43/20* | (2018.01) | |
| *F21V 14/00* | (2018.01) | |

(52) U.S. Cl.
CPC .............. *B60Q 1/34* (2013.01); *B60Q 1/381* (2022.05); *B60Q 1/444* (2013.01); *B60Q 1/5037* (2022.05); *B60Q 1/543* (2022.05); *F21S 41/60* (2018.01); *F21S 41/635* (2018.01); *F21S 41/645* (2018.01); *F21S 41/675* (2018.01); *F21S 41/683* (2018.01); *F21S 41/689* (2018.01); *F21S 43/00* (2018.01); *F21S 43/26* (2018.01); *F21V 14/003* (2013.01); *B60Q 1/545* (2022.05)

(58) Field of Classification Search
CPC ........ B60Q 1/441; B60Q 1/442; B60Q 1/444; B60Q 1/46; B60Q 1/503; B60Q 1/5035; B60Q 1/506; B60Q 1/507; B60Q 1/508; B60Q 1/509; B60Q 1/52; B60Q 1/525; B60Q 1/54; B60Q 1/544; B60Q 1/545; B60Q 1/547; B60Q 1/549; B60Q 1/46503; F21S 43/00; F21S 43/26; F21S 41/64; F21S 41/645; F21V 14/003; F21Y 2113/00; F21Y 2113/10; F21Y 2113/13; F21Y 2113/20

See application file for complete search history.

(56) References Cited

U.S. PATENT DOCUMENTS

| | | |
|---|---|---|
| 3,787,808 A | 1/1974 | Knopf |
| 3,816,113 A * | 6/1974 | Haas ........................ G09F 13/00 |
| | | 349/169 |
| 4,631,516 A | 12/1986 | Clinker |
| 4,928,084 A | 5/1990 | Reiser |
| 5,193,893 A | 3/1993 | Mitko |
| 5,517,389 A | 5/1996 | Myers |
| 5,652,565 A | 7/1997 | Salcedas et al. |
| 5,786,752 A | 7/1998 | Bucalo et al. |
| 5,829,870 A | 11/1998 | Remillard et al. |
| 5,847,646 A | 12/1998 | Mucciacciaro |
| 6,225,918 B1 | 5/2001 | Kain |
| 6,426,696 B1 | 7/2002 | Ortega |
| 6,753,769 B1 | 6/2004 | Elliott |
| 6,867,692 B2 | 3/2005 | Weatherspoon |
| 6,885,294 B1 | 4/2005 | Tonkin |
| 7,048,422 B1 * | 5/2006 | Solomon ................. B60Q 1/50 |
| | | 345/76 |
| 7,834,752 B2 | 11/2010 | Kuvantrarai |
| 9,925,915 B2 | 3/2018 | Bauerle |
| 2003/0016543 A1 | 1/2003 | Akiyama |
| 2003/0107323 A1 | 6/2003 | Stam |
| 2003/0206418 A1 * | 11/2003 | Strazzanti .............. C09K 19/60 |
| | | 362/540 |
| 2004/0145905 A1 * | 7/2004 | Strazzanti ............. F21S 41/645 |
| | | 362/510 |
| 2005/0238857 A1 | 10/2005 | Day |
| 2006/0273891 A1 | 12/2006 | Quach et al. |
| 2007/0040664 A1 | 2/2007 | Johnson et al. |
| 2007/0058386 A1 | 3/2007 | Albou |
| 2007/0160334 A1 | 7/2007 | Cobb et al. |
| 2008/0198372 A1 * | 8/2008 | Pan ......................... B60Q 1/381 |
| | | 356/121 |
| 2008/0284924 A1 * | 11/2008 | Hofmann .............. G02F 1/1333 |
| | | 349/5 |
| 2008/0309478 A1 | 12/2008 | Morales |
| 2009/0046355 A1 | 2/2009 | Derda |
| 2009/0052200 A1 | 2/2009 | Tessnow et al. |
| 2009/0134984 A1 | 5/2009 | Chen |
| 2009/0257241 A1 | 10/2009 | Meinke et al. |
| 2010/0066514 A1 | 3/2010 | Sekol |
| 2011/0013412 A1 | 1/2011 | Kobayashi |
| 2012/0113667 A1 | 5/2012 | Brandt et al. |
| 2013/0314937 A1 | 11/2013 | Takahashi et al. |
| 2014/0003072 A1 | 1/2014 | Yamamoto et al. |
| 2014/0214272 A1 | 7/2014 | Albou et al. |
| 2014/0253315 A1 | 9/2014 | Bement |
| 2014/0268837 A1 | 9/2014 | Simchak et al. |
| 2014/0376076 A1 * | 12/2014 | Chen ..................... F21S 41/645 |
| | | 359/275 |
| 2015/0015392 A1 | 1/2015 | Israel |
| 2015/0078025 A1 | 3/2015 | Kleiner |
| 2015/0179139 A1 * | 6/2015 | Watanabe ................. G09F 9/35 |
| | | 345/592 |
| 2015/0219302 A1 | 8/2015 | Yagi et al. |
| 2015/0323149 A1 * | 11/2015 | Salter ................... B60Q 1/2661 |
| | | 362/510 |
| 2015/0375673 A1 | 12/2015 | Testai et al. |
| 2016/0027350 A1 * | 1/2016 | Stockton ............... G09F 13/005 |
| | | 40/544 |
| 2016/0123550 A1 | 5/2016 | Ahn |
| 2017/0305332 A1 * | 10/2017 | Albou .................... B60Q 1/324 |
| 2017/0341565 A1 | 11/2017 | Kurashige |
| 2019/0145599 A1 | 5/2019 | Kogure |

FOREIGN PATENT DOCUMENTS

| | | | | |
|---|---|---|---|---|
| EP | 8401591 A1 | 11/2018 | | |
| FR | 2605086 A1 * | 4/1988 | | |
| GB | 2357580 A * | 6/2001 | ............... | B60Q 1/44 |
| JP | 04081337 A | 3/1992 | | |
| JP | H0533188 U * | 4/1993 | | |
| JP | H11222073 A * | 8/1999 | | |
| WO | WO-2010015990 A2 * | 2/2010 | ............... | F21S 10/02 |

* cited by examiner

US 12,090,916 B2

EXTERIOR LIGHTING

This application is a continuation of U.S. patent application Ser. No. 16/526,905, filed Jul. 30, 2019, which is a division of U.S. patent application Ser. No. 15/092,540, filed Apr. 6, 2016, which claims the benefit of provisional patent application No. 62/143,703, filed Apr. 6, 2015, each of which is hereby incorporated by reference herein in their entireties.

BACKGROUND

This relates generally to lighting, and, more particularly, to vehicle lighting.

Vehicles such as automobiles have exterior lighting such as turn signals, headlights, and taillights. Light sources such as light-emitting diodes and lamps have been used to provide illumination for exterior lights.

It can be challenging to incorporate light sources into a vehicle. If care is not taken, light sources may be overly conspicuous or may consume more space within a vehicle than desired.

It would therefore be desirable to be able to provide enhanced exterior lighting for vehicles.

SUMMARY

A vehicle or other system may be provided with light-based devices that emit light. The light may serve as illumination for the interior or exterior of the device. For example, the light-based devices may serve as headlights on a vehicle. The light may also serve to convey braking information or other information to observers outside of the vehicle. Emitted light from the light-based devices may include text and symbols. Different patterns of light may be emitted under different braking conditions or in response to detection of other changes in vehicle operating conditions.

A light-based device for a vehicle may be formed from a leaky optical fiber or other leaky optical waveguide. A laser, light-emitting diode, or other component may serve as a light source for the light-based device. A mirror may collimate light from the light source. A protective transparent cover may cover the light-based device when the light-based device is mounted in an opening in the body of the vehicle.

A mechanical or electrical shutter may be operated in a transparent mode when the light source is producing light and an opaque mode in which the light source is not producing light. When operated in the opaque mode, the shutter may obscure the light source, mirror, and other internal components from view from an observer located outside of the vehicle.

The shutter may include a mechanical shutter that is moved using a positioner. Electronic shutters may be implemented using light modulating layers such as liquid crystal shutters and electrochromic shutters.

Light modulators in the light-based devices may be adjusted dynamically to produce patterns of output light that vary as a function of applied vehicle braking or other vehicle operating conditions. Sensors, wireless circuitry that receives information on traffic and weather, and user input devices may be used in gathering input that affects how the light-based devices are adjusted.

DETAILED DESCRIPTION

Systems such as vehicles and other systems may incorporate light-emitting devices. As an example, a vehicle may have headlights that emit light to provide illumination to areas in front of a vehicle, taillights to provide drivers behind a vehicle with braking and turn signal information, and other vehicle lighting (e.g., fog lights, parking lights, side lights, etc.).

Figure 1:
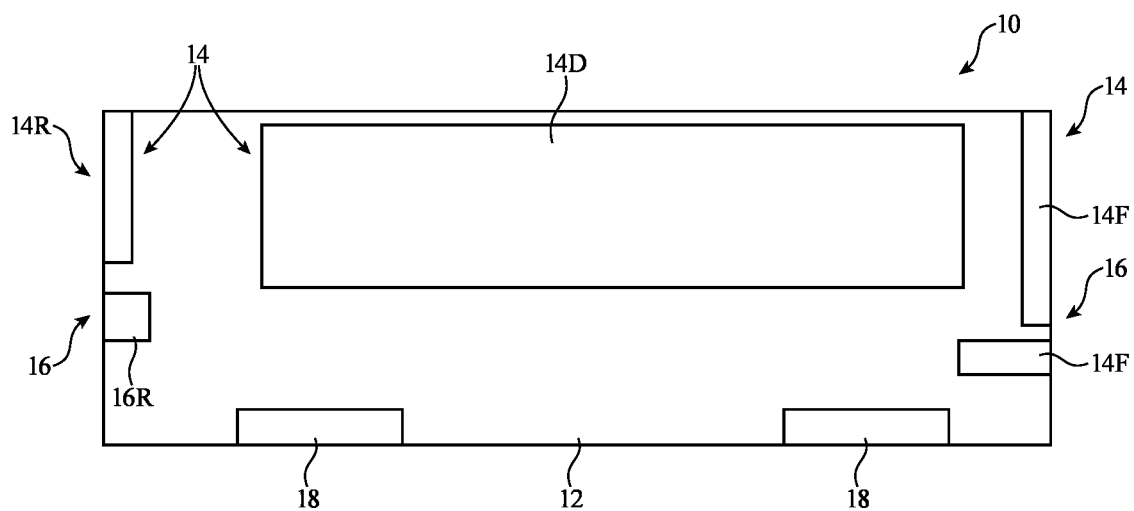
FIG. 1 is a side view of an illustrative vehicle with light-based devices in accordance with an embodiment.

A side view of an illustrative vehicle of the type that may be provided with vehicle lighting is shown in FIG. 1. As shown in FIG. 1, vehicle 10 may include a body such as body 12. Body 12 may have body panels and other structures that are mounted on a chassis. Interior components in vehicle 10 such as seating for a driver and other vehicle occupants may be supported by the chassis. External components such as wheels 18 may also be mounted to the chassis. The structures that make up body 12 may include metal structures, structures formed from fiber-composite materials such as carbon-fiber materials and fiberglass, plastic, and other materials.

Vehicle body 12 may include doors. Windows 14 may be formed at the front and rear of vehicle 10 in openings in body 12 and may be formed within the doors or other portions of the body 12 of vehicle 10. As shown in FIG. 1, for example, vehicle 10 may have a front window such as front window 14F that faces the front of vehicle, rearward facing windows such as rear window 14R, and side windows such as windows mounted within the doors of vehicle 10 (see, e.g., side windows 14D). Windows 14 may be formed from glass (e.g., glass laminated with polymer layers), plastics such as polycarbonate, or other clear materials.

Devices that emit light may be used in vehicle 10 to provide exterior lighting (e.g., environmental lighting), to display information for pedestrians, drivers and passengers in vehicles that are in the vicinity of vehicle 10, and other observers. Because these devices emit light, they may sometimes be referred to as light-based devices, light-emitting devices, or lighting systems. Light-based devices for vehicle 10 may include vehicle lights (e.g., headlights, taillights, etc.).

In some configurations, the light-emitting devices of a vehicle may supply text, icons, stationary or moving patterns of light, colored light, light that varies in intensity, and/or other light-based output that can inform a nearby pedestrian, driver, or autonomously operated computing equipment such as an autonomously operated vehicle, traffic management system, roadside camera system, or other systems of the intentions of the driver of the vehicle. As an example, a driver can direct a light-based device such as a turn signal to supply output that indicates whether the driver is about to turn left or right. Input from sensors, wirelessly received information (e.g., information from nearby vehicles, pedestrians, transmitters embedded along roadways, etc.), and/or information from other sources can be used in determining what type of output to supply using a light-based device. For example, information on the operating environment of vehicle 10 and/or input from a driver of vehicle 10 can be used in determining when and how to activate a brake light or other light-based warning to following vehicles (e.g., a rear window warning, taillight warning, etc.). Output from vehicle 10 may also include audio output for a driver and/or others in the vicinity of vehicle 10. Illustrative configurations in which light-based devices are used for supplying various types of output are sometimes described herein as an example. In general, any suitable input and output devices may be used for gathering information on the operation of vehicle 10 and may be used for supplying output to a driver of vehicle 10 and others.

Figure 2:
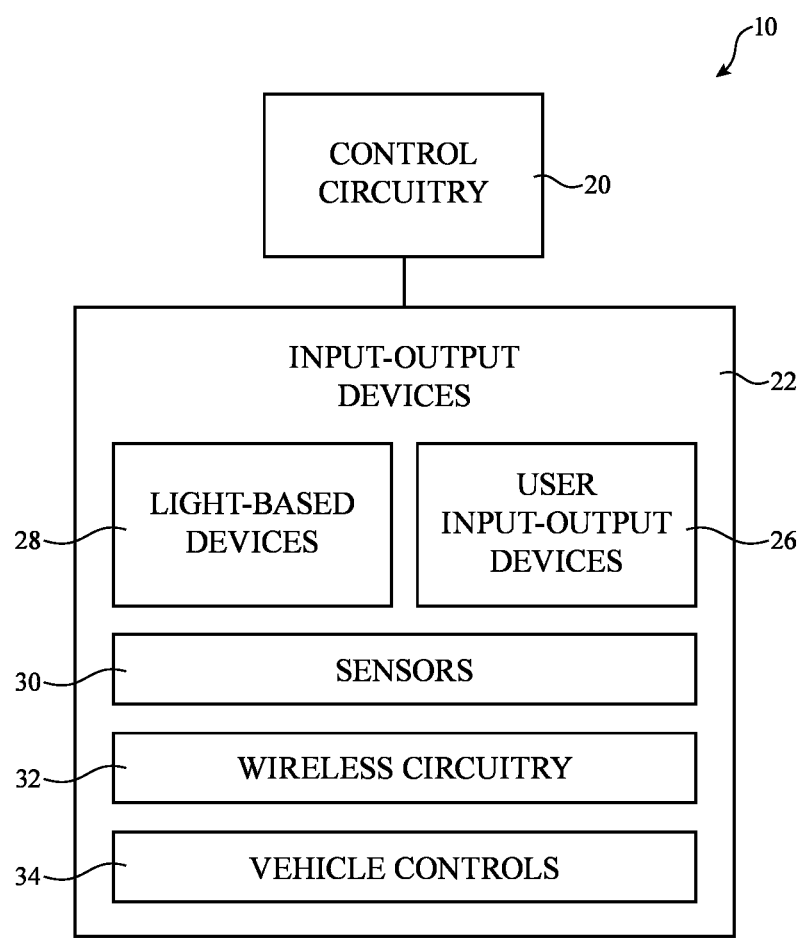
FIG. 2 is a schematic diagram of an illustrative vehicle or other system with light-based devices in accordance with an embodiment.

A schematic diagram of illustrative circuitry that may be used in operating vehicle 10 is shown in FIG. 2. As shown in FIG. 2, vehicle 10 may include control circuitry 20. Control circuitry 20 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 20 may be used to control the operation of device 10. The processing circuitry may be based on one or more microprocessors, microcontrollers, digital signal processors, baseband processors, power management units, audio chips, application specific integrated circuits, electronic control units, etc.

Vehicle 10 may include input-output devices 22 that allow data to be supplied to vehicle 10 and that allow data to be provided from vehicle 10 to external systems. Input-output devices 22 may include sensors 30 for gathering information on the operating environment of vehicle 10. Sensors 30 may include light-based sensors, wireless sensors such as radar sensors, ultrasonic sensors, proximity sensors, range-finding sensors, ambient light sensors, strain gauges, parking sensors, cruise control sensors, accelerometers, touch sensors, magnetic sensors such as electronic compass sensors, temperature sensors, rain sensors and other moisture sensors, force sensors, pressure sensors (e.g., altimeters), and other components for making measurements on the environment surrounding vehicle 10.

As shown in FIG. 2, input-output devices 22 may include user input-output devices 26. Devices 26 may be used to gather input from users (e.g., a driver or passenger of vehicle 10) and may be used in providing output to users. Devices 26 may include buttons, joysticks, steering wheels, shift levels and/or buttons, foot-actuated controllers (e.g., a throttle pedal, a brake pedal, a clutch pedal, etc.), touch pads, keypads, keyboards, motion sensors, microphones, cameras, and other devices for gathering user input. Input devices in devices 26 may also circuitry for generating audio output such as speakers, tone generators, and vibrators and circuitry for generating visible output. Light-based devices 28 may include internal devices and external devices for providing light-based output. Light-based devices 28 may include lamps, light-emitting diodes and other status indicators, displays, lasers, arrays of light sources, individual light sources, backlight units for displays, light sources that emit one or more beams of light (e.g., a laser or collimated light source), light sources that emit light in a fixed pattern of one or more beams, light sources that emit light using raster scanning techniques, lights that include mechanical and/or electrical modulators such as mechanical shutters, liquid crystal shutters, electrochromic shutters, electrically and/or mechanically adjusted mirrors, or other electronic or mechanical light modulators, etc.

Light-based devices 28 may contain individually controlled areas. These areas may be relatively small areas that may serve as pixels in an array of pixels for a display-type output device and/or may contain one or only a few larger controlled areas (e.g., areas that are patterned to form predefined symbols). Light-based devices 28 may display one or more larger-sized outputs (e.g., light output for a brake light, light output that includes text, light output that includes an arrow or other symbol, etc.). These different outputs may be varied as a function of operating conditions or other input.

In some configurations, light-based devices 28 may use an array of pixels or other arrangements to display images, to display text, to display icons, to display video, or to display other visual output. In a mechanical or electronic shutter, the shutter may be directed to either pass light or to block light. Shutters may be used to obscure portions of light-based devices 28 from view by an observer outside of vehicle 10. Shutters and other structures may also be used to block portions of light-based devices 28 from view by observers inside vehicle 10.

Devices 28 with individually controlled pixels may be capable of supplying detailed output such as detailed symbols, images, text, etc. The functions of light-based devices 28 and user input-output devices 26 need not be mutually exclusive. For example, a device that supplies output to a vehicle that is following vehicle 10 in a line of traffic may also supply output to the driver or a passenger of vehicle 10.

Light-based devices 28 may include light sources such as lasers, light-emitting diodes, and lamps. Light-based devices 28 may include modulators such as mechanical shutters, liquid crystal devices (e.g., devices with arrays of pixels and/or that serve as shutters), cholesteric liquid crystal devices or other liquid crystal shutters that exhibit opaque (light scattering) and transparent modes, electrochromic devices that exhibit opaque and transparent modes, and other modulating devices. Devices 28 may produce rasterized output (e.g., rastered laser beams), may include backlit devices, and may include other equipment for producing light-based output.

Wireless circuitry 32 may include radio-frequency transceiver circuitry and antennas for transmitting and receiving wireless signals. The signals may include, for example, short-range signals such as wireless local area network signals (WiFi® and Bluetooth® signals) and long-range signals (e.g., cellular telephone signals and other signals at frequencies of 700 MHz to 2700 MHz and/or other suitable frequencies). Wireless information may be shared with nearby vehicles, sensors and beacons embedded along a roadway, satellites, cellular telephone networks, cellular telephones, wristwatches, and other wireless devices associated with a driver and passengers in vehicle 10, etc. Wireless information that is received by circuitry 32 may include traffic information, weather information, information on the status of nearby vehicles (e.g., direction of motion, acceleration/deceleration, brake status (braking due to application of brakes by a driver or not braking), throttle status (applied or not applied), temperature information, road condition information (as measured by sensors in vehicles and/or external sensors), etc.

Vehicle controls 34 may include control circuitry, actuators, and other systems for controlling vehicle operation. Vehicle controls 34 may include systems for steering, braking (manual brakes, emergency brakes, power-assisted brakes, drum brakes, disc brakes, regenerative brakes that use drive motors or other systems to recover energy and convert the kinetic energy of vehicle 10 into electrical energy stored in capacitors and/or batteries or that use other techniques for storing recovered energy, or other braking systems), accelerating, shifting gears, adjusting interior and exterior lights, adjusting infotainment functions, controlling satellite navigation system operation, adjusting airbags, seatbelts, and other safety devices, controlling audio output, controlling electronic windows, door locks, the opening and closing of doors and hatches, windshield wipers, defrosters, and other climate controls, and systems for controlling and adjusting other operations during the operating of vehicle 10.

Using information from sensors 30, user input and other input from devices 26, and/or information received wirelessly from remote sources via wireless circuitry 32, vehicle 10 may determine actions to take in supplying output and otherwise controlling the operation of vehicle 10. As an example, control circuitry 20 may determine that light-based devices 28 should be adjusted to supply headlight output, to supply brake light output (e.g., output from a taillight such as light 16R or rear window 14R that includes braking light and/or icons or information indicating that vehicle 10 is being braked), to supply turn signal information, or to supply other light-based output. Control circuitry 20 can also supply visible and/or audio output to a driver and passengers of vehicle 10 using devices 26 (e.g., by issuing audio alerts, by displaying output information on a display in an infotainment system in vehicle 10, etc.). Control circuitry 20 may, if desired, control the steering, braking, and acceleration functions and other functions of vehicle 10 in response to the information received from devices 26, circuitry 32, and/or sensors 30. As an example, vehicle 10 may steer and brake vehicle 10 to avoid collisions or to autonomously reach a desired destination.

Light-based devices 28 may be used in implementing interior and/or exterior lighting systems for vehicle 10. As an example, light-based devices 28 may be used in forming headlights 16F, taillights 16R, lights on mirrors (e.g., side mirror turn lights located near the front of side windows 14D), fog lights, spotlights, other external lights 16 for vehicle 10. Lights 16 may be formed in openings in body 12 (e.g., a taillight opening for each taillight 16R, etc.). If desired, light-based devices 28 may provide trim around headlights, taillights, or other lights, and/or may provide output through rear window 14R or other windows 14.

Light-based devices 28 may be configured to have an appearance that contrasts with body 12 or may be provided with an appearance that blends with body 12. For example, light-based devices 28 may be provided with a color, texture, and/or other visual attributes that match the visual attributes of nearby portions of body 12. If, as an example, body 12 has a dark appearance, light-based devices 28 may be operable in a state (e.g., an off state) in which the external appearance of light-based devices 28 is also dark. With this type of arrangement, light-based devices 28 may appear sufficiently similar to body 12 and/or other portions of vehicle 10 to be hidden or nearly hidden from view. If desired, light-based devices 28 may have an appearance that makes devices 28 visible against body 12 (i.e., light-based devices 28 may have an appearance that contrasts with that of body 12). Illustrative arrangements in which light-based devices 28 have an appearance that minimizes visual disturbance (i.e., that hides some or all of the components of light-based devices 28 from view from the exterior of vehicle 10) may sometimes be described herein as an example.

Figure 3:
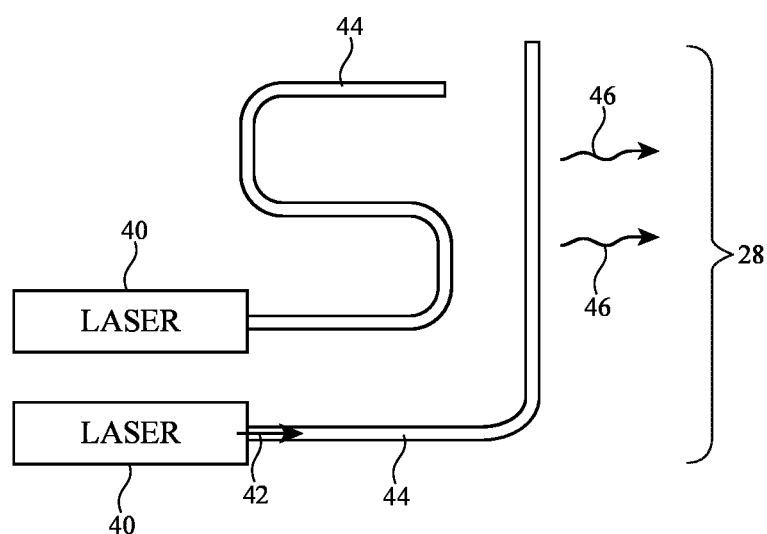
FIG. 3 is a diagram showing how leaky optical fibers may be used to serve as a light-based device for a vehicle in accordance with an embodiment.

An illustrative configuration for light-based device 28 in which light is guided through leaky optical fibers or other optical waveguides is shown in FIG. 3. With this type of arrangement, device 28 may include one or more light sources such as lasers 40. Lasers 40 may be diode lasers that produce laser light of a desired color (e.g., red, blue, green, yellow, white, etc.). Each laser 40 may produce light of a different color that is launched into a respective different optical waveguide or one or more of lasers 40 may produce light of the same color. Waveguides 44 may be optical fibers formed from clear plastic, transparent glass, or other transparent material. Waveguides 44 may have a core with a first index of refraction and a cladding with a second index of refraction that is lower than the first index of refraction or may have other light guiding structures (e.g., waveguides 44 may be formed from a core fiber material that has not cladding). Waveguides 44 may, if desired, be formed on a flexible substrate or other substrate. Fiber-based waveguides may be secured in a desired shape using adhesive, fasteners, or other mounting arrangements.

Waveguides 44 may be configured to have a leaky characteristic (e.g., waveguides 44 may be formed from materials having index of refraction values and light scattering attributes that cause waveguides 44 to emit light outwards along their lengths). As shown in the example of FIG. 3, lasers 40 may launch light 42 into waveguides 44. Due to their leaky nature, light 42 may leak out of waveguides 44 evenly (or unevenly) along their lengths, as shown by emitted light 46 in FIG. 3. This allows waveguides 44 to serve as light-emitting structures for device 28. Waveguides 44 may be used as trim pieces that surround other light-emitting structures, may be used to form text, symbols, or other shapes, may be mounted within body panel gaps in body 12 or other recesses within body 12, or may be mounted elsewhere within vehicle 10.

Figure 4:
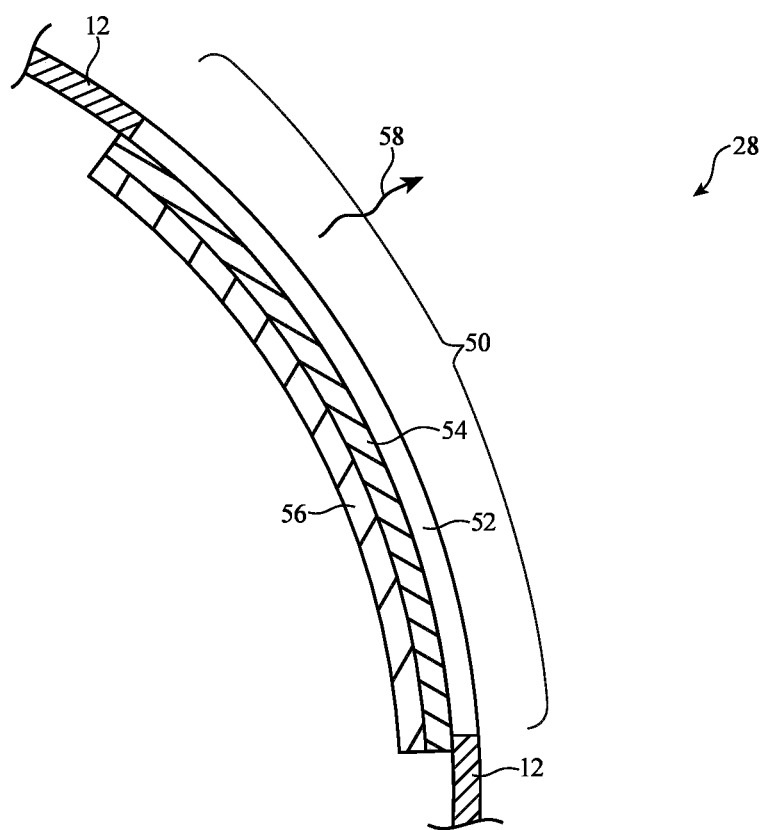
FIG. 4 is a cross-sectional side view of an illustrative vehicle light having a conformal light source in accordance with an embodiment.

In the illustrative configuration of FIG. 4, body 12 has an opening such as opening 50 and light-based device 28 has light-emitting component 54. Light-based device 28 may have a protective outer layer such as protective cover layer 52. Layer 52 may be formed from clear or colored glass, plastic, or other clear and/or colored material. Cover layer 52 may have a curved surface that is configured to mate with the curved outer surface of surrounding portions of body 12 and/or the outer surface and opposing inner surface of cover layer 52 may have other shapes (e.g., planar surfaces, profiles with curved and flat portions, etc.). Light-emitting layer 54 may be based on an organic light-emitting diode structure (e.g., one or more organic light-emitting diodes) and may be formed on a flexible substrate. Light-emitting diode layer 54 may emit light in a single block, may have two or more individually controlled portions, may have pre-patterned portions in the shape of symbols (e.g., arrows, parts of arrows, warning signs, etc.), may have numerous pixels to form a low-resolution or high-resolution display, or may have other structure that allow an on-off signal or more complex light-based output (e.g., an image, an icon, text, etc.) to be displayed.

Light-emitting layer 54 may be mounted to the inner surface of protective cover 52 (e.g., using adhesive, heat and pressure, etc.). Support structure 56 may be formed from plastic, metal, glass, other materials and/or combinations of these materials. If desired, light-emitting layer 54 may be a flexible organic light-emitting diode device formed from one or more independently controlled or parallel light-emitting diodes on a substrate such as a transparent polyimide substrate or other clear flexible sheet of polymer. In this configuration, support structure 56 may be a molded plastic part, a machined structure, a backing layer, or other supporting member that has a color and texture that helps match the appearance of light-based device 28 in opening 50 to that of the surrounding adjacent portions of vehicle body 12.

If, as, an example, body 12 is blue, structure 56 may be blue. Light-emitting layer 54 may be operated in a first state (an ON state) in which the diode(s) of layer 54 emit light 58 to the exterior of vehicle 10 and in a second state (an OFF state) in which the diode(s) of layer 54 do not emit light so that layer 54 is transparent. In the transparent off state of layer 54, an observer located outside of vehicle 10 will view structure 56 through protective layer 52 and layer 54 (which is transparent). Because layer 56 is blue (in this example), light-based device 28 in opening 50 will have a blue color that matches the blue color of surrounding portions of body 12. If desired, the colored structures of layer 56 may be incorporated into the substrate layer for light-emitting device 54 (i.e., layers 54 and 56 may be formed from a unitary structure).

Figure 5:
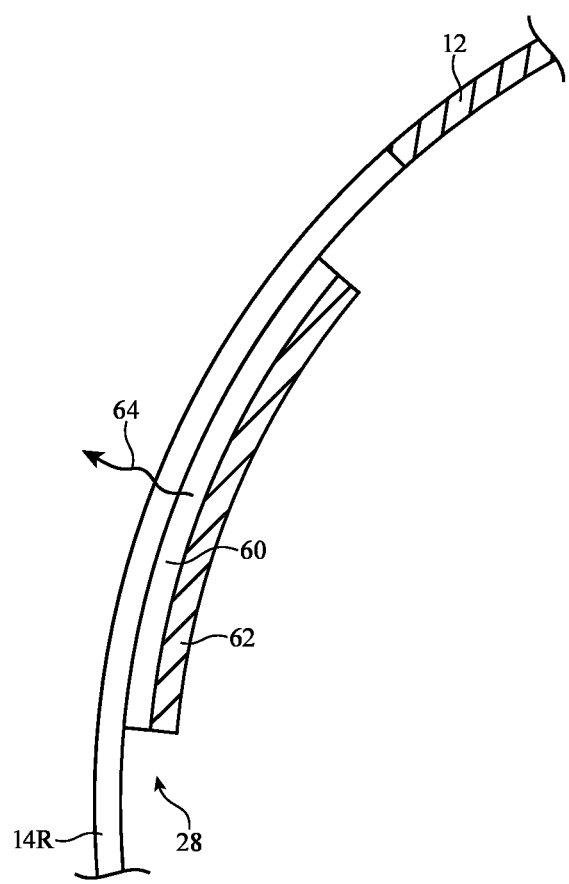
FIG. 5 is a cross-sectional side view of illustrative vehicle lighting having a transparent light-emitting device sandwiched between a vehicle window and an electronic shutter such as a liquid crystal shutter or electrochromic shutter in accordance with an embodiment.

As shown in FIG. 5, light-based device 28 may be configured to emit light 64 out of the rear portion of vehicle 10. Light-based device 28 may, for example, be mounted behind rear window 14R. Window 14R may be formed from plastic, glass, and/or other transparent materials. Light-based device 28 may include a light-emitting layer such as layer 60. As described in connection with layer 54 of FIG. 4, layer 60 may have one or more light-emitting diodes or other structures that are operated individually and/or in parallel to output desired patterns of light 64 out of rear window 14R. A driver of a vehicle that is following behind vehicle 10 may observe the pattern of light 64 produced by light-based device 28. This allows light 64 to be used as a one-level or multiple-level brake light, to provide the following driver with status information on road conditions (e.g., "obstruction ahead") or to otherwise supply the following driver with appropriate information.

Light-emitting layer 60 may be formed on a transparent polyimide substrate or other flexible transparent substrate, which allows layer 60 to conform to the inner surface of window 14R. Adhesive or other attachment mechanisms may be used to mount layer 60 to window 14R. Layer 62 may be an electrically controllable light modulating device such as an electronic shutter. Layer 62 may be, for example, a shutter as a cholesteric liquid crystal shutter that exhibits a transparent state and an opaque state. When layer 60 is off, control circuitry 20 may place layer 62 in its transparent state. This allows the driver of vehicle 10 to see clearly through rear window 14R without visual obstruction due to the presence of device 28. When layer 60 is on and is emitting light 64, layer 62 may either be transparent (in which case the driver can observe that the brake light or other light output 64 that is being provided to the following vehicle is present) or may be opaque (in which case light 64 is blocked and does not distract the driver). In the opaque state, layer 62 may either absorb light 64 that is directed towards layer 62 or may be reflective to help recycle light 64 by reflecting light 64 from layer 60 out the rear of vehicle 10 through window 14R.

Figure 6:
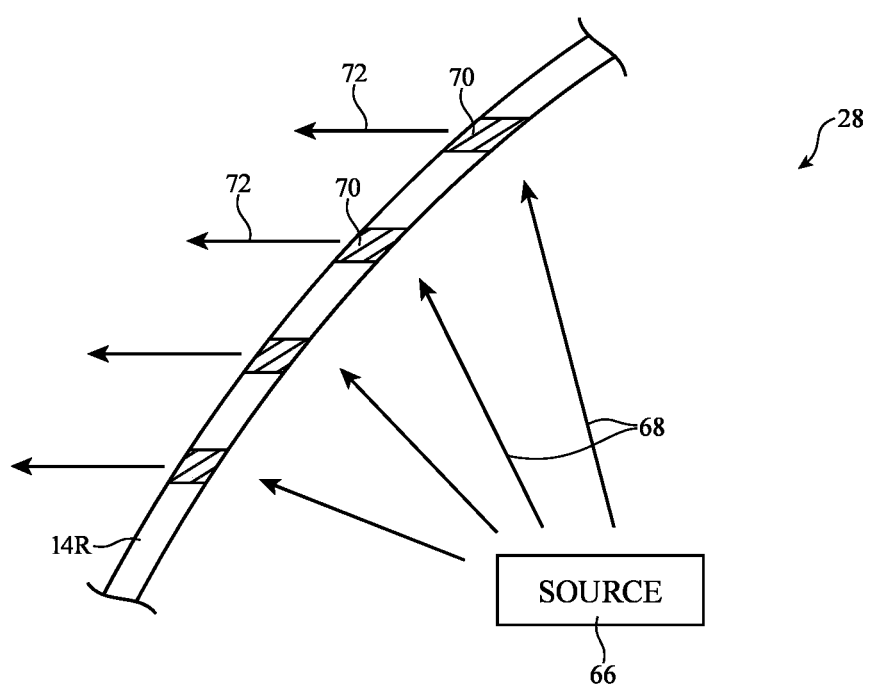
FIG. 6 is a cross-sectional side view of an illustrative transparent vehicle window structure with diffractive elements that can be used to direct light in a desired direction in accordance with an embodiment.

As shown in FIG. 6, light-based device 28 may have a light source such as light source 66 that emits beams of light 68. Light source 66 may include a laser, a light-emitting diode, or other component that generates light. Beams 68 may be generated by passing emitted light from a laser, light-emitting diode, or other light-generating component through a fixed optical beam splitting structure (e.g., a structure with lenses, gratings, mirrors, or other structures for creating multiple parallel beams from an input beam) and/or by using a mechanical or optical beam steering device to raster scan the output beam from source 66 over multiple beam positions (shown as separate beams 68 in FIG. 6). Individual beams 68 may also be produced by respective individual lasers or other light sources. Beams 68 may be aligned with diffractive elements 70 that are mounted within or on rear window 14R. As each beam 68 strikes an associated diffractive element 70, that diffractive element diffracts beam 68 rearward towards the driver of the vehicle following vehicle 10, as indicated by diffracted beams 72 of FIG. 6. The fixed patterned of intensities of beams 68 or the dynamically adjusted intensities of beams 68 may be used to produce fixed and/or dynamically adjusted patterns of light 72 and may be used to present warning signs, text, graphics, and other information. Diffractive structures for forming elements 70 may be formed as integral portions of rear window 14R, as part of a textured polymer or glass layer attached to the inner surface of rear window 14R, as discrete elements mounted on window 14R, as a coating on window 14R, or may be formed using other structures for directing light beams 68 in the rearward direction indicated by beams 72.

Figure 7A:
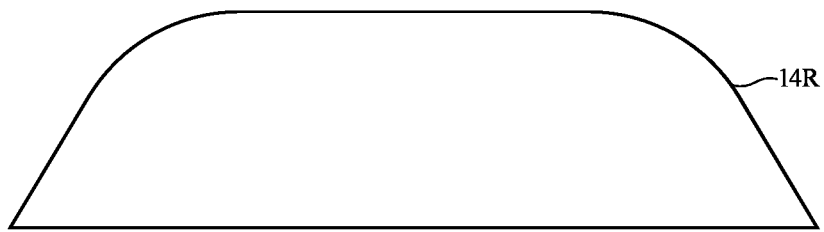
FIGS. 7A, 7B, 7C, and 7D are rear views of an illustrative vehicle window that has an integrated light-emitting device that displays information for following vehicles in accordance with an embodiment.
Figure 7B:
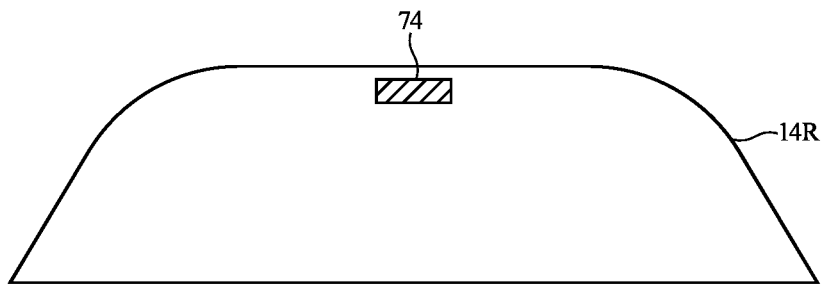
Figure 7C:
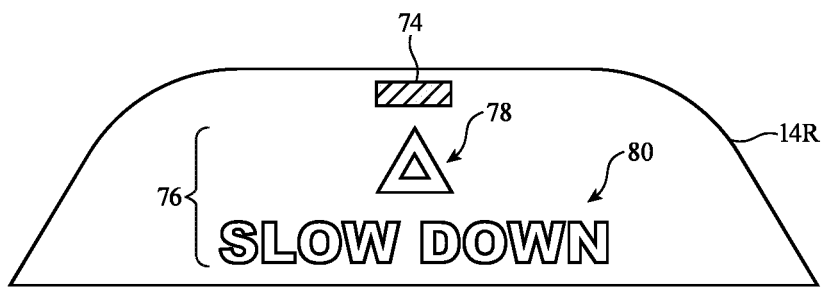
Figure 7D:
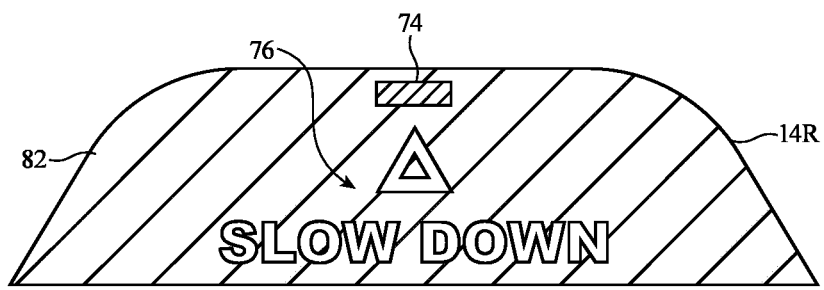

With one suitable arrangement, systems of the types shown in FIGS. 5 and 6 or other light-based devices 28 may be used to produce braking indicators that vary as a function of braking intensity, vehicle speed, driving conditions, sensor inputs, traffic, wirelessly received data, or other factors. Consider, as an example, the displayed output on rear window 14R of FIGS. 7A, 7B, 7C, and 7D. As shown in FIG. 7A, when no light output is being produced by light-based device 28 (e.g., light-based device 28 of FIG. 5, light-based device 28 of FIG. 6, or other light-based device 28 that presents information on rear window 14R), rear window 14R may be transparent and may therefore be free of visible obstructions to the driver of vehicle 10 or the driver of the vehicle following vehicle 10. As shown in FIG. 7B, when the driver of vehicle 10 lightly brakes vehicle 10, an area such as rectangular area 74 may be illuminated by device 28. Area 74 may be positioned in a region of rear window 14R that allows area 74 to serve as a center high mounted stop light. When the driver of vehicle 10 brakes moderately, an additional brake alert such as alert information 76 may be displayed below illuminated area 74, as shown in FIG. 7C. Additional information 76 may include warning icons such a warning triangle 78 and warning messages such as warning message 80 (e.g., text). In response to hard braking by the driver of vehicle 10, most or all of the rear surface of window 14R may be illuminated by device 28 in addition to illuminating area 74 and displaying information 76, as shown by illustrative illuminated region 82 of FIG. 7D.

If desired, there may be more levels of information displayed or fewer levels of information displayed on rear window 14R, information of the type shown in FIGS. 7A, 7B, 7C, and 7D and/or other information presented by device 28 may be displayed elsewhere in vehicle 10 (e.g., on front window 14R, on side windows 14D, on a rear-view mirror, etc.), and/or input other than braking information (e.g., information on weather conditions, traffic, vehicle speed, the behavior of pedestrians, sensor data, etc.) may be used in determining what level of alert or other information to display with device 28. The arrangement of FIGS. 7A, 7B, 7C, and 7D is merely illustrative.

Figure 8:
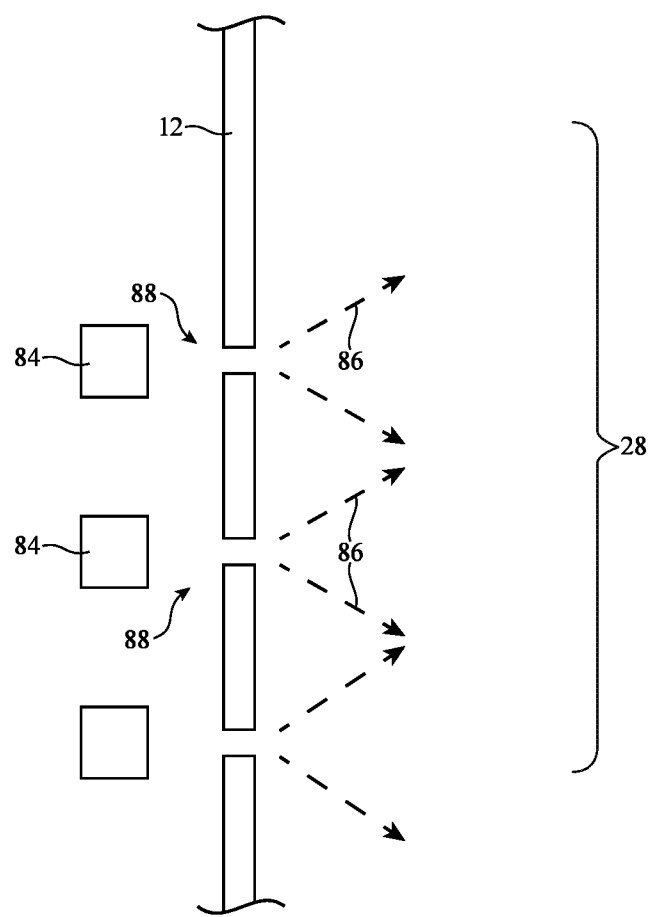
FIG. 8 is a cross-sectional side view of illustrative vehicle lighting based on an array of illuminated microperforations in accordance with an embodiment.

In the illustrative configuration of FIG. 8, light-based device 28 has an array of light sources 84 such as light-emitting diodes, lasers, lamps, etc. Light sources 84 may be aligned with respective openings 88 in body 12. Openings 88 may be circular, rectangular, or may have other shapes. During operation, light sources 84 may be adjusted to produce light 86 that passes through openings 88 for viewing by an observer located outside of vehicle 10. Light sources 84 may each produce the same amount of light or some or all of light sources 84 may be individually adjusted so that light-based device 28 can produce different light output patterns under different operating conditions, as described in connection with light-based devices 28 of FIGS. 5 and 6 and the illustrative arrangement of FIGS. 7A, 7B, 7C, and 7D. There may be fifty or more openings 88 and respective light sources 84 or any other suitable number of openings and light sources (10-1000, more than 10, more than 10,000, less than 5,000, etc.). Openings 88 may have widths (e.g., diameters) of 0.1 to 10 mm, less than 5 mm, less than 2 mm, less than 1 mm, less than 0.5 mm, or less than 0.3 mm. The use of relatively small opening sizes for openings 88 may help minimize the visual impact of placing light-based device 28 of FIG. 8 on the exterior surface of body 12 of vehicle 10. There may be a sufficient number of light sources 84 in light-based device 28 of FIG. 8 to cover 1-100 cm² of surface area on body 12, to cover 50-1000 cm² of surface area on body 12, to cover more than 10 cm² of surface area, or to cover less than 2000 cm² of surface area (as examples).

If desired, openings such as openings 88 or larger openings may be filled with polarizers, one-way mirrors, or other materials to help block interior components from view. Polarized glass for lights 16 may prevent diffuse light from the exterior of vehicle 10 from illuminating internal components, while allowing polarized light from a light source inside device 28 from exiting vehicle 10. A corresponding polarizing filter may be placed on windows 14 (e.g., front window 14F) to help block reflected light (e.g., window 14F may have a polarizer that is complementary to the polarization of lights 16), thereby reducing headlight glare (i.e., glare from headlights 16F in other vehicles). One-way mirrors may allow light from the interior of vehicle to exit vehicle 10 while reflecting exterior light and thereby minimizing the visibility of internal components.

Figure 9:
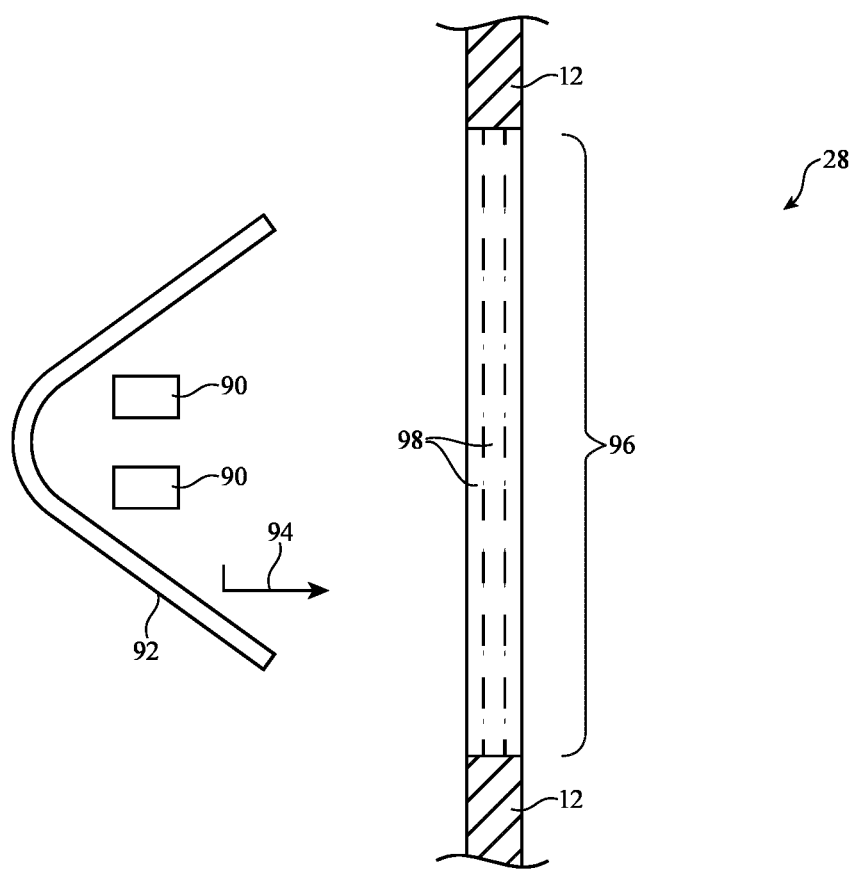
FIG. 9 is a cross-sectional side view of an illustrative vehicle lighting system having multicolored backlighting in accordance with an embodiment.

In the illustrative example of FIG. 9, light-based device 28 includes light sources 90. There are two light sources 90 in the example of FIG. 9. More light sources 90 or fewer light sources 90 may be used, if desired. Light sources 90 may be light-emitting diodes, lasers, lamps, or other sources of illumination. Each light source 90 may, if desired, have a different respective color. For example, in a scenario in which there are two light sources 90 in light-based device 28, a first of the light sources may be a yellow light source such as a yellow light-emitting diode and a second of the light sources may be a red light source such as a red light-emitting diode. Emitted light 94 from light sources 90 may be reflected through light modulator 96 using light collimating mirror 92 (e.g., a metallized plastic structure, a curved metal member, etc.). Light sources 90 may serve as backlight sources for light modulator 96 (e.g., to provide red and yellow backlight in the example of FIG. 9).

Light modulator 96 may be mounted in an opening in body 12. Body 12 may have curved portions adjacent to modulator 96 and modulator 96 may, if desired, have a curved shape that matches that of body 12 or modulator 96 and/or body 12 may be planar in the vicinity of light-based device 28.

Light modulator 96 may be operable in an opaque state in which the appearance of modulator 96 matches the appearance of body 12 and/or in which modulator 96 is sufficiently dark to block interior components of light-based device such as light sources 90 and mirror 92 from view. When modulator 96 is in its opaque state, light sources 90 may be turned off to conserve power. Light modulator 96 may also have an active state. During the active state, a selected one of light sources 90 is turned on and produces backlight 94 that passes through light modulator 96 (i.e., modulator 96 is at least partly transparent in its active state).

Light modulator 96 may be formed from one or more layers 98. Layers 98 may form a liquid crystal shutter (e.g., layers 98 may include a pair of polarizers, liquid crystal material between the polarizers, and transparent electrodes for modulating the electric field applied to the liquid crystal material). Light modulator 96 may also be formed from other light modulating structures (e.g., electrochromic modulator structures, etc.). Light modulator 96 may be monochromatic (i.e., modulator 96 may exhibit only gray tones). In this type of configuration, different colors for light-based device 28 may be created by selectively activating a light source 90 having a desired backlight color (e.g., red, yellow, etc.). Light modulator 96 may be formed from a uniform sheet of material that toggles between opaque and transparent states or the electrodes of light modulator 96 may be patterned to form arrows, stop sign symbols, or other patterns. The use of a light modulator structure that creates patterned transparent regions allows light-based device 28 to display different patterns of light (e.g., one or more brake light messages, turn signals, chasing light turn signals, hazard warnings, pulsing stop lights or other flashing graphics, text, etc.).

If desired, modulator 96 may be configured to exhibit transparency in the event that the operating temperature for vehicle is outside of a desired operating range (e.g., when ambient temperature conditions are lower than desired) and/or when modulator 96 otherwise is unable to perform desired active modulation functions. With this type of fail-safe arrangement, light 94 may be emitted by light-based device 28 even if modulator 96 is unable to be electronically switched.

In the example of FIG. 9, there are two light sources 90 each of which produces light with a different color (yellow and red, respectively). Modulator 96 is monochromatic and can therefore be used to display red output (when the red light source is active) or yellow output (when the yellow light source is active). Light sources 90 may be operated continuously (e.g., with a persistent ON or OFF state, as appropriate) or may be time division multiplexed. As an example, the output from sources 90 may be synchronized so that sources 90 produce red light pulses alternated with yellow light pulses. Modulator 96 can be operated in synchronization with the alternating red and yellow output pulses. So long as the frequency of the alternating color pulses and the synchronized operation of modulator 96 is more than the speed with which the human eye responds (about 0.1 s), the output on device 28 will appear constant (non-flickering) to a human observer. The use of a pair of backlight light sources of alternating colors therefore allows light-based device 28 to display content that appears to simultaneously contain multiple different colors (i.e., yellow and red areas in the present example). Three or more backlight sources of different colors may be used in this way, if desired.

Figure 10:
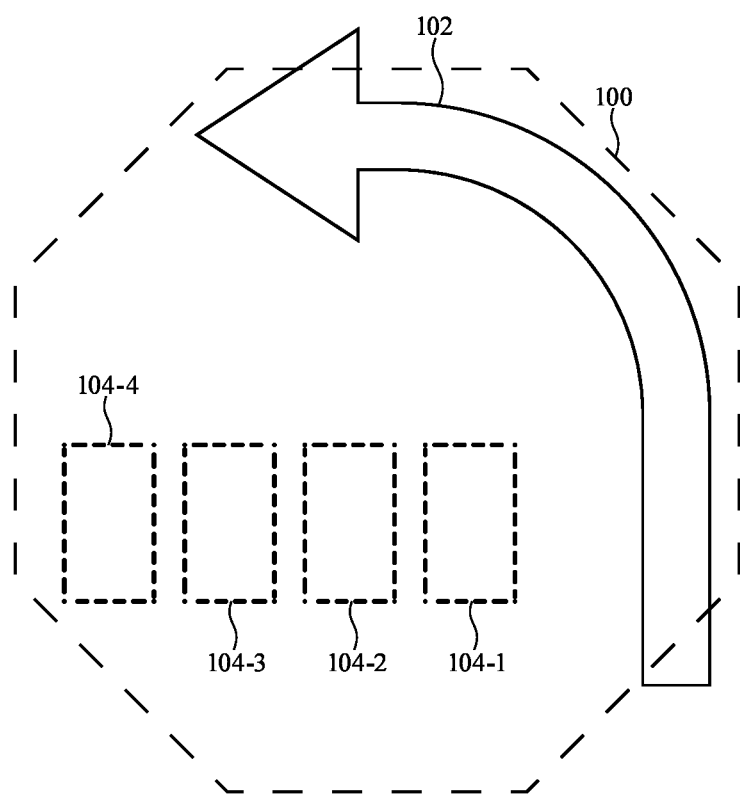
FIG. 10 is a diagram showing illustrative information of the type that may be displayed using a vehicle lighting system of the type shown in FIG. 9 in accordance with an embodiment.

FIG. 10 is diagram showing illustrative patterns of light output that may be provided by light-based device 28 of FIG. 9. When vehicle 10 is braking, red light may be produced by a red backlight source and modulator 96 may be transparent within octagonal stop-sign icon region 100 (and opaque elsewhere). When a driver of vehicle 10 is making a left turn, yellow light may be produced by a yellow backlight source and modulator 96 may adjusted to be transparent within the interior of left turn icon 102 (and opaque elsewhere). A left-turn chasing light turn signal may be implemented by adjusting modulator 96 to make regions 104-1, 104-2, 104-3, and 104-4 transparent in sequence while generating yellow illumination with sources 90. In this example, modulator 96 has been provided with electrodes that are patterned to form symbols that overlap. To simplify electrode layouts, each of the different patterns that are displayed on light-based device 28 may be implemented using a discrete set of non-overlapping electrodes in modulator 96. The arrangement of FIG. 10 in which differently colored patterns of output light are produced using overlapping light modulator electrodes (for creating overlapping light modulator transparent regions) is merely illustrative.

The use of a light modulator such as light modulator 96 of FIG. 9 that has relatively large electrodes (e.g., an electrode for modulating electric fields through a large octagon-shaped region of modulator 96, electrodes for large turn-signal areas of modulator 96, etc.) or the use of an organic light-emitting diode display panel with similarly shaped large diode electrodes helps reduce electrode complexity. The use of a monochromatic arrangement for modulator 96 may help enhance light transmission and improve power efficiency.

If desired, more complex "display-like" configurations may be used for light-based devices 28. These devices may allow control circuitry 20 to create potentially complex dynamically adjustable output patterns (e.g., text and/or icons that change depending on operating conditions). For example, different types of messages may be displayed depending on context. Urgent messages may be displayed with more colors, brighter colors, more emphatic wording, more surface area, etc. Less urgent messages may be displayed in less urgent manner. Icons may change depending on context (e.g., icons for braking may be displayed during braking, icons for turning may be displayed when turning, etc.). Software updates and other updates and/or user-adjusted or manufacturer-adjusted settings may be used to modify the type of output that light-based devices 28 produce. For example, the size, shape, color, and movement of a turn signal can be adjusted depending on the current geographic location of vehicle 10, thereby ensuring that vehicle 10 satisfies applicable vehicle regulations.

Figure 11:
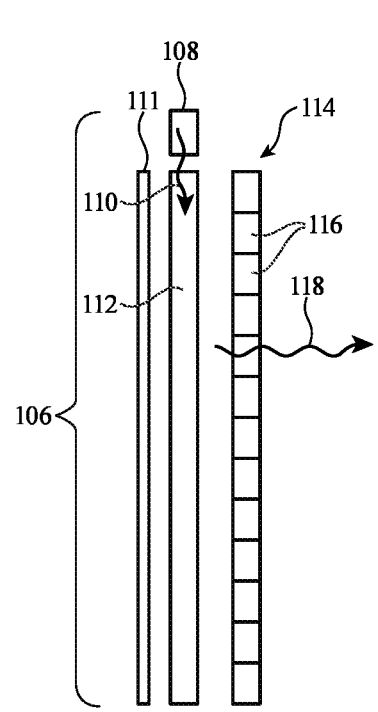
FIG. 11 is a cross-sectional side view of an illustrative vehicle lighting system having a backlight and a light modulator with an array of pixels accordance with an embodiment.
Figure 12:
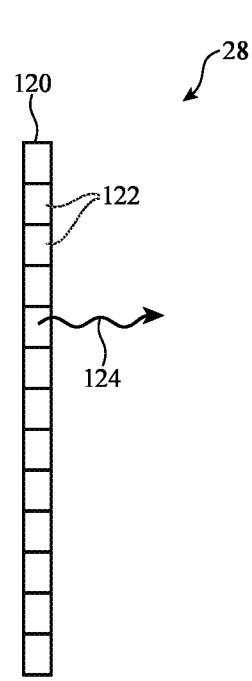
FIG. 12 is a cross-sectional side view of an illustrative vehicle lighting system having an array of light-emitting elements in accordance with an embodiment.
Figure 13:
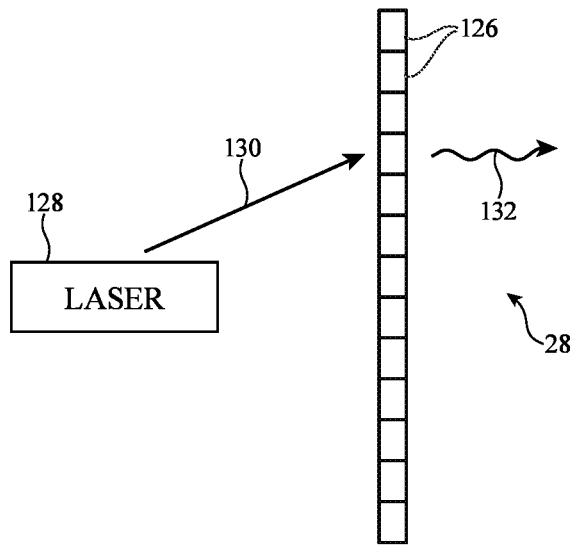
FIG. 13 is a cross-sectional side view of an illustrative vehicle lighting system having an array of elements illuminated by a light source such as a laser in accordance with an embodiment.

Illustrative display-type light-based devices 28 that may be used in vehicle 10 are shown in FIGS. 11, 12, and 13. In the example of FIG. 11, light-based device 28 has a liquid crystal light modulator such as modulator 114 that has an array of individually controllable pixels 116. There may be any suitable number of pixels 116 in modulator 114 (e.g., hundreds, thousands, etc.). Backlight unit 106 may include a light guide plate such as plate 112. Light-emitting diodes 108 may emit light 110 into an edge of light guide plate 112. This light may be conveyed within light guide plate 112 by total internal reflection. A portion of the guided light in plate 112 may be scattered out of plate 112 by light scattering features such as pits or bumps. Reflector 111 may help direct scattered light through modulator 114. In this way, backlight unit 106 may produce backlight 118 that passes outwardly through modulator 114. The array of pixels 116 in modulator 114 may be controlled (made transparent, opaque, etc.) by control circuitry 20 to display output light in a desired pattern.

In the illustrative example of FIG. 12, output light 124 is patterned by controlling an array of individually controlled pixels 122 in organic light-emitting diode device (display) 120. Organic light-emitting diode device 120 may contain monochromatic pixels 122 or may contain pixels of different colors. As an example, pixels 122 may include red pixels and yellow pixels to produce patterns of red and yellow light of the type described in connection with FIG. 10.

FIG. 13 is a cross-sectional side view of an illustrative configuration for light-based device 28 that is based on an array of diffractive elements 126. A light source such as laser 128 may emit a raster scanned light beam 130 or may emit an array of individually controlled light beams 130 to illuminate each of elements 126 to produce a corresponding diffracted output beam 132. The intensity of light 130 at each element 126 may be modulated so that the pattern of light 132 that is output by device 28 has a desired shape (e.g., the shape of an icon, text, or other information).

If desired shutter-type structures may be used to help block internal components in light-based device 28 from view when device 28 is not emitting light.

Figure 14:
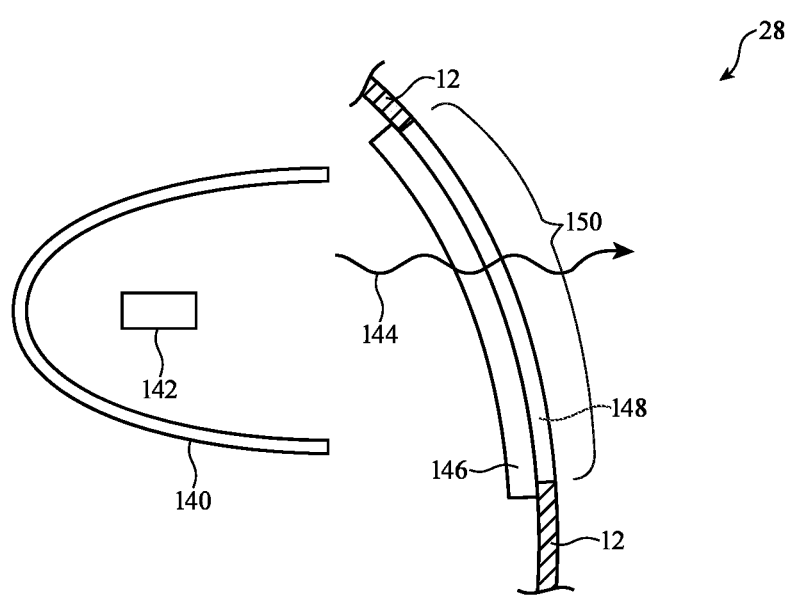
FIG. 14 is a cross-sectional side view of an illustrative vehicle lighting system with an electrically adjustable shutter to selectively cover a light source and mirror in accordance with an embodiment.

In the illustrative arrangement of FIG. 14, device 28 has been formed within opening 150 of body 12. Protective layer 148 may be layer of plastic, glass, or other transparent material. Layer 148 may be mounted in opening 150 and may have a shape (curvature, etc.) that matches that of body 12. Electronic shutter 146 may be mounted on the interior of layer 148 and may overlap opening 150. Shutter 146 may be formed from a liquid crystal shutter device or other light modulator (e.g., shutter 146 may be an electronically controllable shutter based on cholesteric liquid crystals, etc.). Shutter 146 may exhibit a first state in which shutter 146 is transparent. In the first state, light source 142 may produce output light 144 that passes through shutter 146. Mirror 140 may be used to collimate the light from light source 142. Shutter 146 may also exhibit a second state in which shutter 146 is opaque (e.g., black or at least translucent) and therefore blocks more light than when shutter 146 is in the first state. When light source 142 (e.g., a light-emitting diode, etc.) is off and is not producing light 144, shutter 146 may be placed in its second (light blocking) state to help block source 142 and mirror 140 from view from the exterior of vehicle 10.

Figure 15:
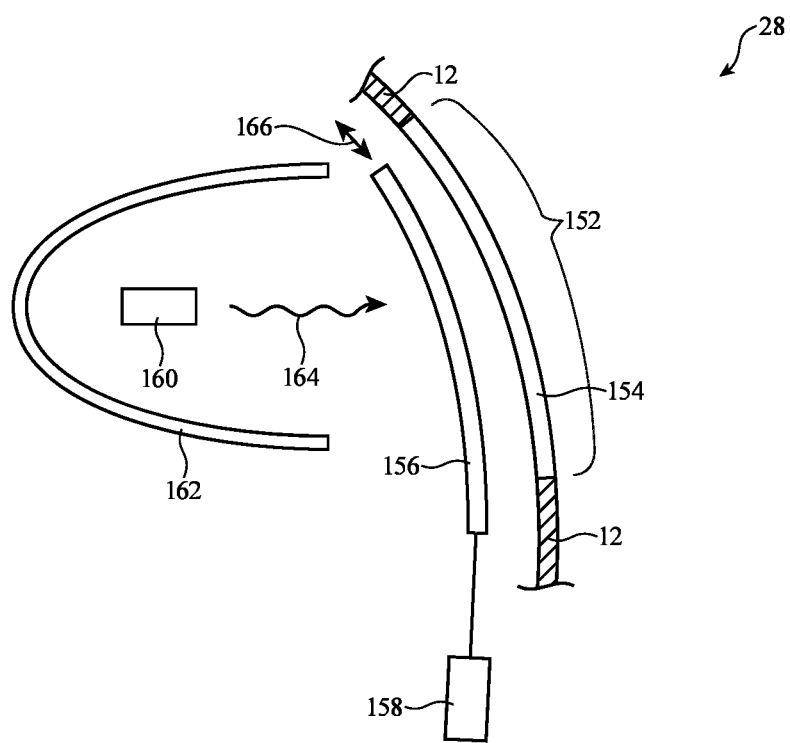
FIG. 15 is a cross-sectional side view of an illustrative vehicle lighting system with a movable mechanical shutter to selectively cover a light source and mirror in accordance with an embodiment.

In the illustrative configuration of FIG. 15, light-based device 28 has a protective layer such as protective layer 154 that is mounted in an opening such as opening 152 in body 12. Layer 154 may be formed from clear material such as glass or plastic and may have a shape that matches the shape of adjoining portions of body 12. Light source 160 may produce light 164 that is collimated by mirror 162. When control circuitry 20 turns light source 160 on, light 164 passes through protective layer 154 and is emitted from opening 152 in body 12. When light source 160 is off and not being used to emit light, shutter 156 may be placed in a position such as the illustrative position of FIG. 15 in which shutter 156 overlaps and blocks opening 152 and layer 154. Shutter 156 may be a structure such as plastic or metal sheet that has a color and texture that matches the visual appearance of body 12 (as an example). Shutter 156 may be moved in directions 166 using electrically controlled positioner 158. Positioner 158 and other shutter components for light-based devices 28 may be controlled by control circuitry 20 of FIG. 2.

Figure 16:
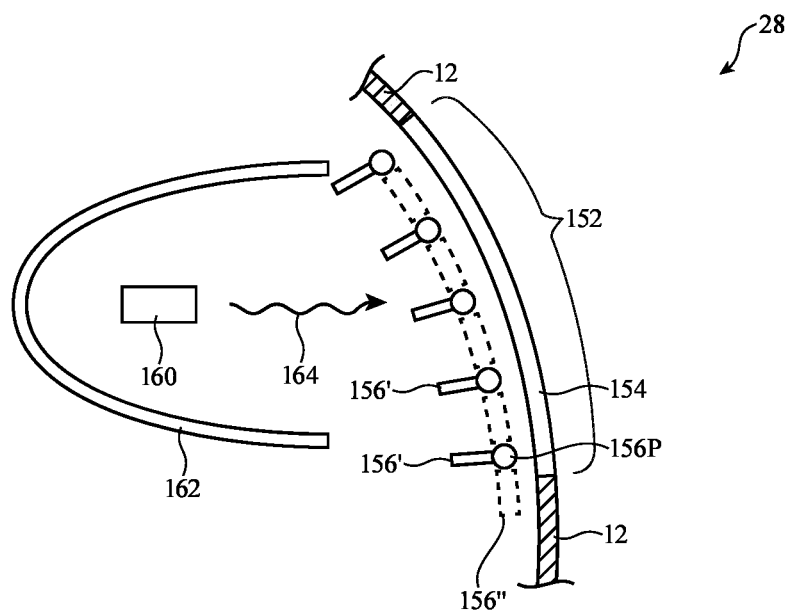
FIG. 16 is a cross-sectional side view of an illustrative vehicle lighting system with a louvered shutter that may be used to selectively cover a light source in accordance with an embodiment.

As shown in FIG. 16, a mechanical shutter such as the shutter of FIG. 15 may be implemented using a louvered configuration. With this type of approach, the shutter has louvers that can be pivoted about pivots 156P by actuators built into pivots 156P or other positioning components in response to commands from control circuitry 20. The louvers may be placed in open positions 156' to allow light 164 to be emitted or closed positions 156" to block light source 160 and mirror 162 from view.

Figure 17:
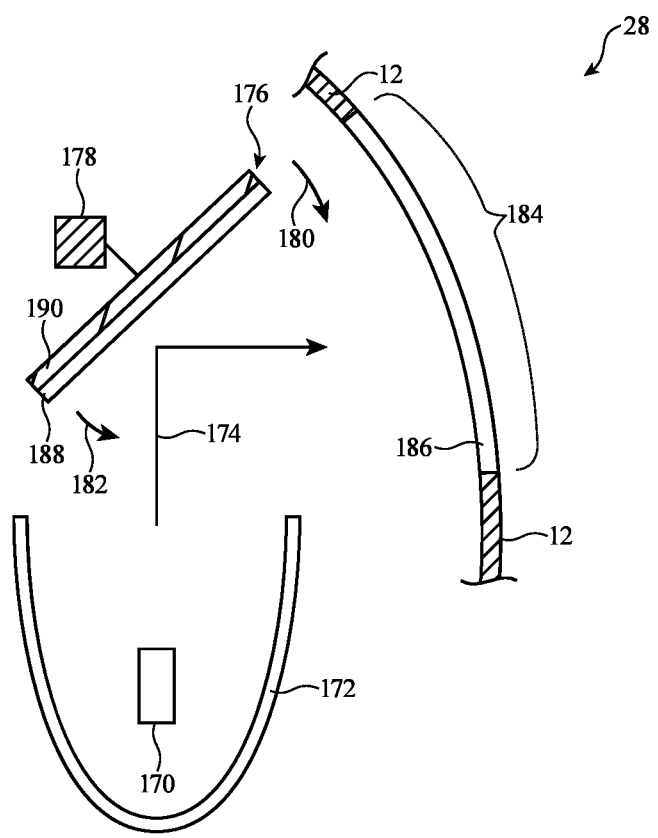
FIG. 17 is a cross-sectional view of an illustrative vehicle lighting system with an adjustable mirror that may be adjusted to help selectively obscure a light source and mirror from view in accordance with an embodiment.

FIG. 17 shows how light-based device 28 may use an electronically controlled mirror to help obscure a light source and other internal components from view when not in use. Illustrative light-based device 28 of FIG. 17 has a protective layer such as transparent layer 186 mounted in opening 184 in body 12. Light source 170 may be turned on and off by control circuitry 20. When turned on, light source 170 (e.g., a light-emitting diode) may emit light 174 that reflects from electrically controllable mirror 176 and is emitted though protective layer 186. Mirror 176 may have a reflective support structure such as support structures 190 and an electrically controllable light shutter such as shutter 188. Shutter 188 may be a light modulator based on a liquid crystal component, electrochromic device, or other component that can be placed in either a transparent state or a light-absorbing state under control of control circuitry 20. When light source 170 is on, shutter 188 may be placed in its transparent state. This allows light 174 to reflect from layer 190 and pass through layer 186 and opening 184. Electrically controllable positioner 178 may steer mirror 176 in direction 180 or direction 182 (e.g., when device 28 is being used to implement steerable headlights). When light source 170 is off, shutter 188 may be placed in an opaque (black or at least translucent) state in which mirror 176 is blocked. When mirror 176 is blocked by shutter 188 in this way electronically controlled mirror 176 will not reflect light, so it will be difficult or impossible for an observer outside vehicle 10 to view light source 170 and mirror 172 through opening 184.

Figure 18:
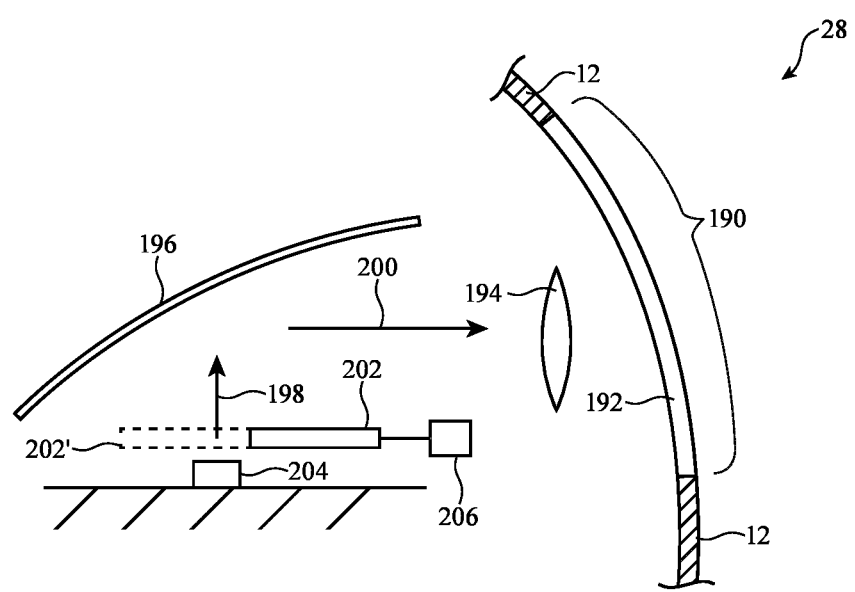
FIG. 18 is a cross-sectional view of an illustrative vehicle lighting system with a movable shutter system that can be used to selectively block a light source in accordance with an embodiment.

Illustrative light-based device 28 of FIG. 18 has a transparent protective structure such as layer 192 in opening 190 of body 12. Light source 204 can be turned on to emit light 198. Light 198 may be reflected from mirror 196 as shown by reflected light ray 200 of FIG. 18. Optional optical structures such as lens 194 may be used to help concentrate light 200. Positioner 206 may be controlled using signals from control circuitry 20 and may be used to move a mechanical shutter. When placed in position 202, the shutter does not block light 198 and light can be emitted from device 28 through opening 190. When light source 204 has been turned off, positioner 206 may move the shutter into position 202' to help block light source 204 from view by an observer external to vehicle 10 (without blocking mirror 196 from view). The appearance of the shutter may be chosen to help visually blend device 28 with the exposed exterior surfaces of body 12.

Figure 19:
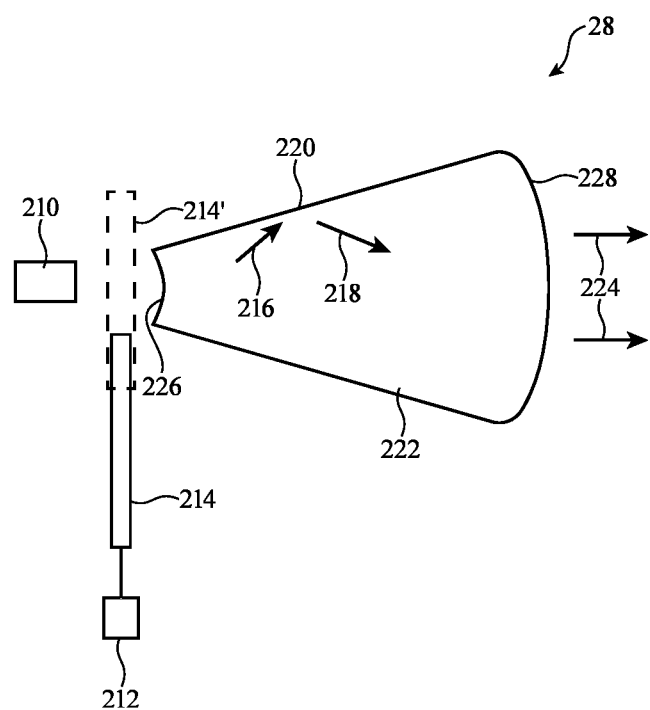
FIG. 19 is a cross-sectional side view of an illustrative vehicle light having a shutter that is selectively interposed.

If desired, light-based device 28 may include a total-internal-reflection lens such as lens 222 of FIG. 19. Light source 210 (e.g., a light-emitting diode) may emit light. The light may enter lens 222 at lens entrance 226. Within lens 222, the light may reflect from the surfaces of lens 222 in accordance with the principle of total internal reflection, as illustrated by the reflection of light ray 216 from surface 220 to produce reflected light ray 218. At curved exit surface 228, light 216 may be emitted as collimated light 224. A mechanical shutter that is controlled by control circuitry 20 can be used to selectively block light source 210 from view. Positioner 212 may move the mechanical shutter into position 214 when it is desired to emit light from light source 210. When light source 210 is turned off, positioner 212 may move the shutter into position 214' to block light source 210 from view by an observer outside of vehicle 10. Lens 222 may be mounted in an opening in body 12 (e.g., behind a protective transparent layer).

Light-based devices 28 may be used in a system such as vehicle 10 or other suitable equipment. Devices 28 may be used to provide illumination and/or to provide informative light output (e.g., text, graphics, icons, etc.). The light output from devices 28 may be supplied to the interior of vehicle 10 or may be supplied to the exterior of vehicle 10. Devices 28 may be used to implement rear lights 16R of FIG. 1, front lights 16F, or other vehicle lights. Devices 28 may also be incorporated into one or more of windows 14 such as window 12R (e.g., to serve as a high center mounted light or other lighting, to provide informative content, to serve as illumination, to provide heads-up display content to a driver of vehicle 10, etc.). Other arrangements may be used for devices 28 if desired. The foregoing examples are merely illustrative.

The foregoing is merely illustrative and various modifications can be made by those skilled in the art without departing from the scope and spirit of the described embodiments. The foregoing embodiments may be implemented individually or in any combination.

What is claimed is:

1. A vehicle, comprising:
a vehicle body having an opening and having a first appearance;
an electrically adjustable light modulator that fills the opening and that includes electrodes arranged to form a symbol shape, wherein the electrically adjustable light modulator is operable in a transparent state and an opaque state, wherein the electrically adjustable light modulator has a second appearance that matches the first appearance when the electrically adjustable light modulator is in the opaque state; and
a light-emitting component that emits light through the electrically adjustable light modulator when the electrically adjustable light modulator is in the transparent state.

2. The vehicle defined in claim 1 wherein the light-emitting component is configured to display a symbol through the electrically adjustable light modulator and wherein the symbol matches the symbol shape of the electrodes.

3. The vehicle defined in claim 2 wherein the symbol is selected from the group consisting of: a hazard warning, a turn signal, and a stop sign.

4. The vehicle defined in claim 1 wherein the electrically adjustable light modulator is configured to cover the light-emitting component and to hide the light-emitting component from view in the opaque state.

5. The vehicle defined in claim 1 wherein the light-emitting component is configured to be off when the electrically adjustable light modulator is in the opaque state.

6. The vehicle defined in claim 1 wherein the electrically adjustable light modulator comprises an electrochromic layer.

7. The vehicle defined in claim 1 wherein the electrically adjustable light modulator comprises a liquid crystal layer interposed between polarizer layers.

8. A system, comprising:
a body having an opening;
an electrically adjustable light modulator in the opening, wherein the electrically adjustable light modulator is adjustable between a transparent state and an opaque state, wherein the electrically adjustable light modulator comprises first electrodes arranged to form a first symbol and second electrodes arranged to form a second symbol, wherein the electrically adjustable light modulator has a first region overlapping the first electrodes and a second region overlapping the second electrodes, wherein the first region is configured to be in the transparent state while the second region is configured to be in the opaque state when the first symbol is being displayed, and wherein the second region is configured to be in the transparent state while the first region is configured to be in the opaque state when the second symbol is being displayed; and
a light-emitting component that emits light through the electrically adjustable light modulator.

9. The system defined in claim 8 wherein the first symbol is an arrow.

10. The system defined in claim 8 wherein the first symbol is a stop sign symbol.

11. The system defined in claim 8 further comprising:
control circuitry configured to adjust a size of the first symbol based on a location of the system.

12. A vehicle, comprising:
a vehicle body having an opening;
an electrically adjustable light modulator in the opening, wherein the electrically adjustable light modulator is adjustable between a transparent state and an opaque state; and
a light-emitting component having first and second light sources respectively configured to emit light of first and second different colors through the electrically adjustable light modulator when the electrically adjustable light modulator is in the transparent state, wherein the light-emitting component is configured to be off when the electrically adjustable light modulator is in the opaque state.

13. The vehicle defined in claim 12 wherein the vehicle body has a first appearance and the electrically adjustable light modulator has a second appearance in the opaque state that is contrasted with the first appearance.

14. The vehicle defined in claim 13 wherein the first and second appearances have respective first and second colors.

15. The vehicle defined in claim 12 further comprising:
a collimating mirror that reflects light from the light-emitting component through the electrically adjustable light modulator.

16. The vehicle defined in claim 15 wherein the collimating mirror comprises a curved metal structure.

17. The vehicle defined in claim 12 wherein the vehicle body has a region with a first curvature, the opening is in the first region, and the electrically adjustable light modulator has a second curvature that matches the first curvature.

18. The vehicle defined in claim 12 wherein the light-emitting component and the electrically adjustable light modulator are configured to display text.

* * * * *